Oct. 28, 1958   T. M. BALL ET AL   2,857,780
TRANSMISSION KICKDOWN CONTROL MECHANISM
Filed June 21, 1955   6 Sheets-Sheet 1
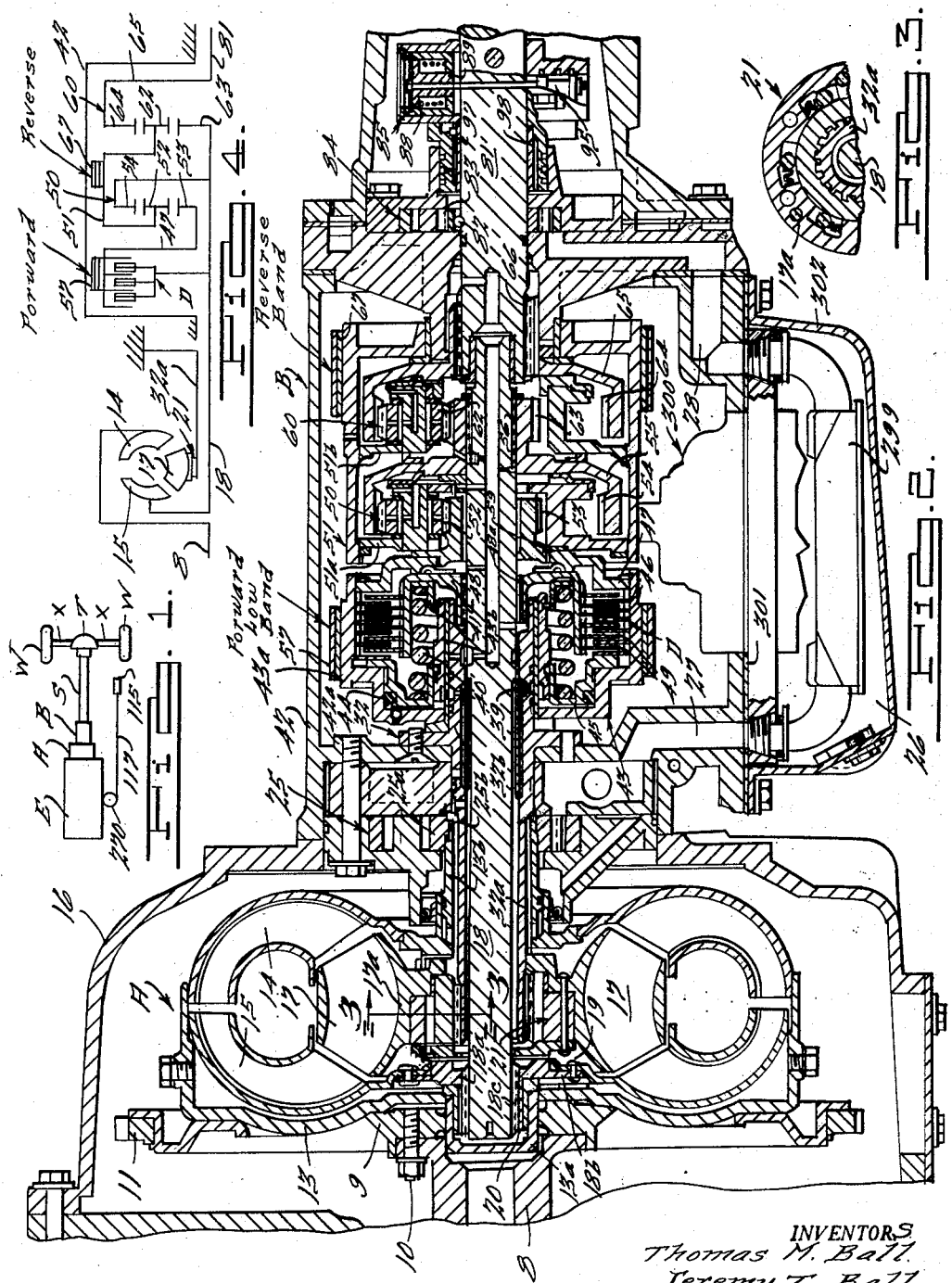
INVENTORS
Thomas M. Ball
BY Jeremy T. Ball
Harness and Harris
ATTORNEYS

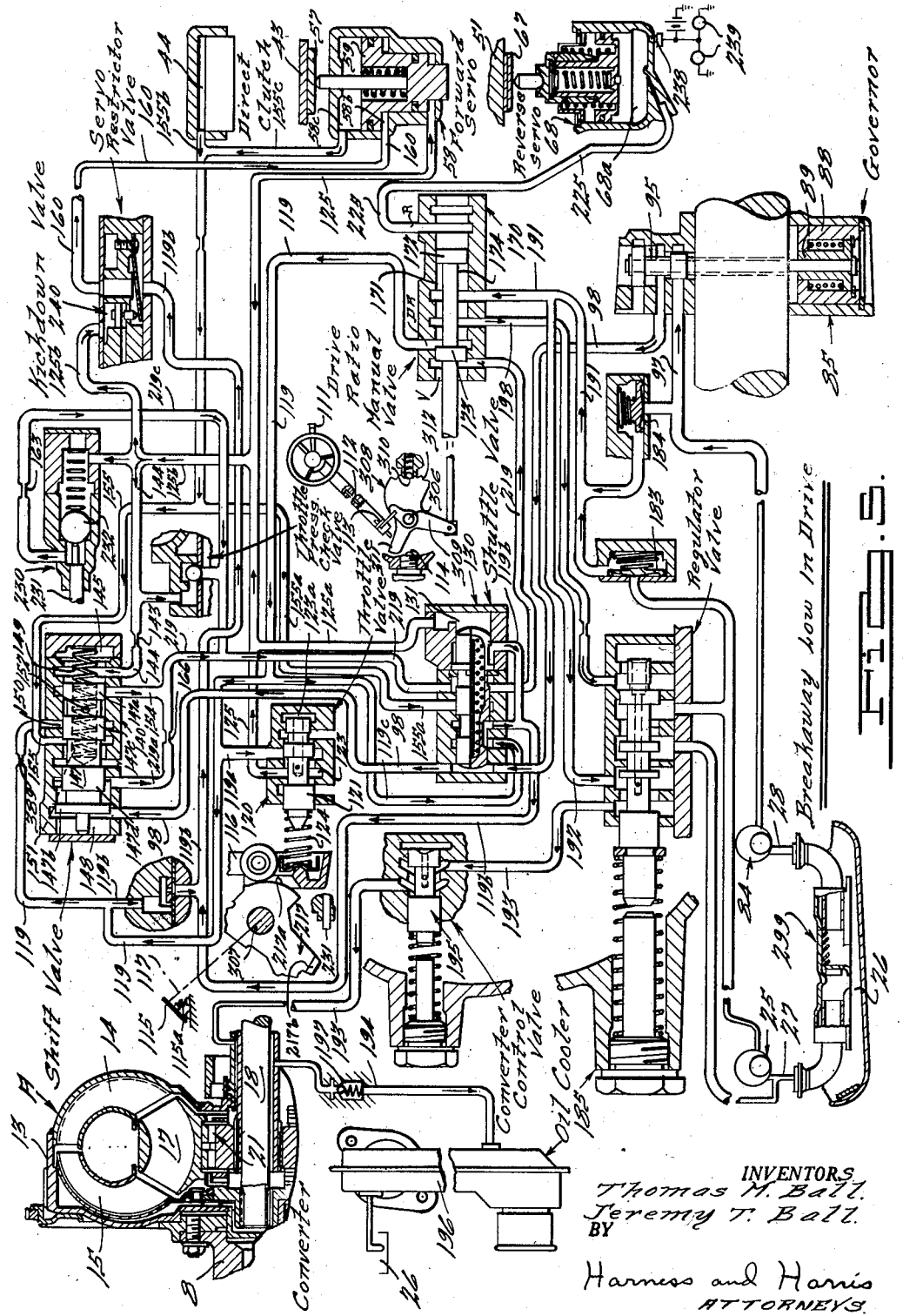

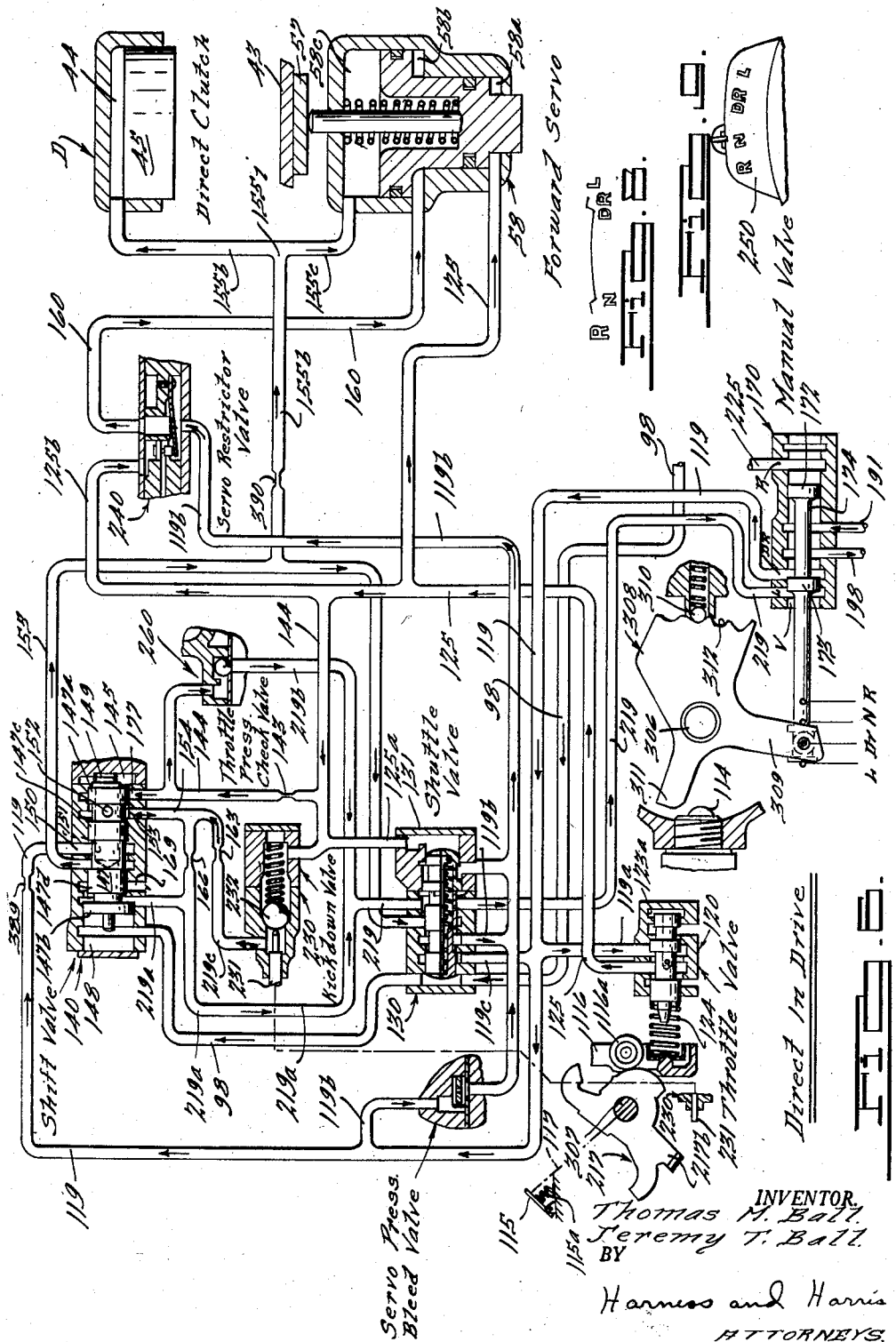

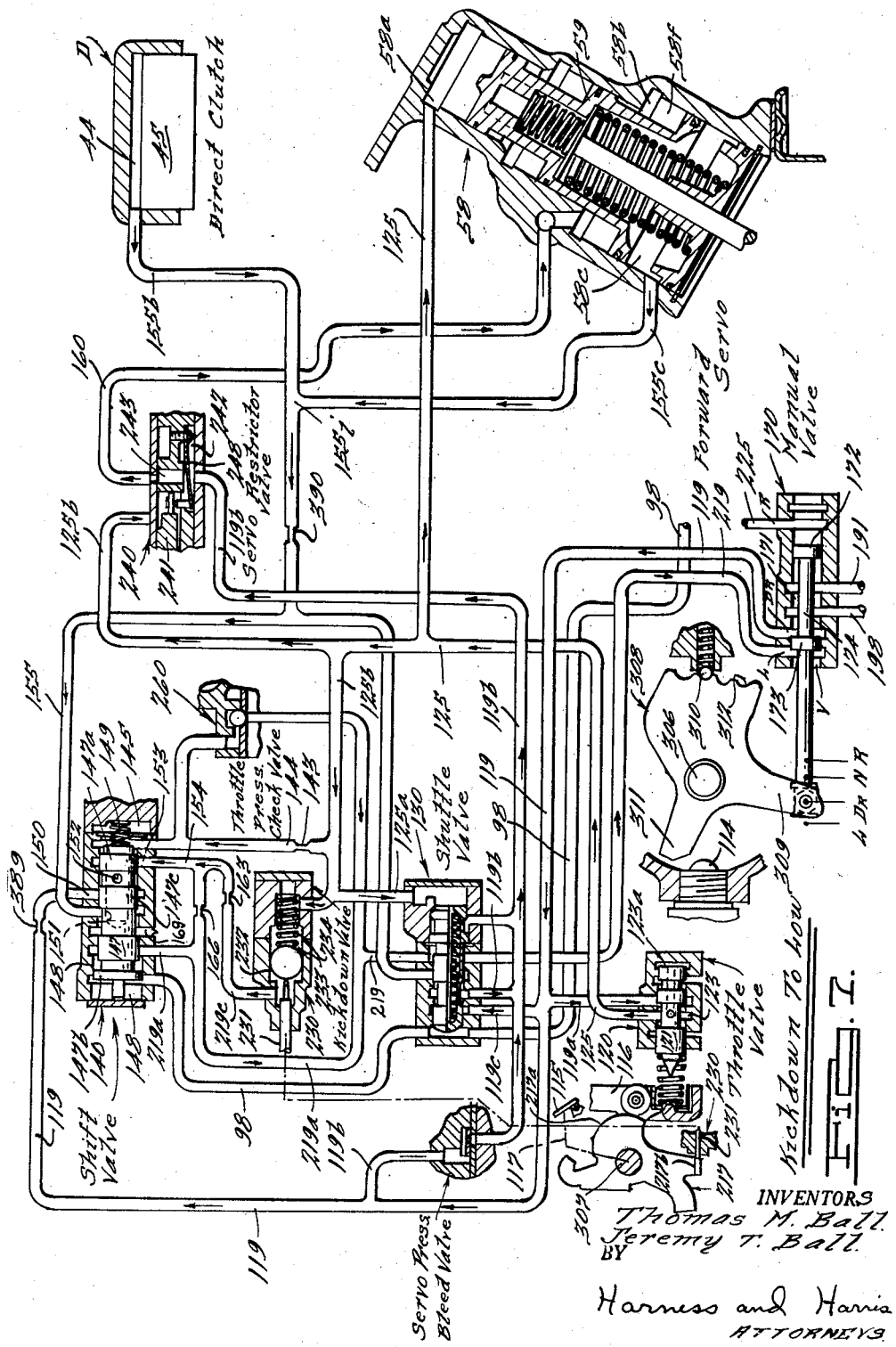

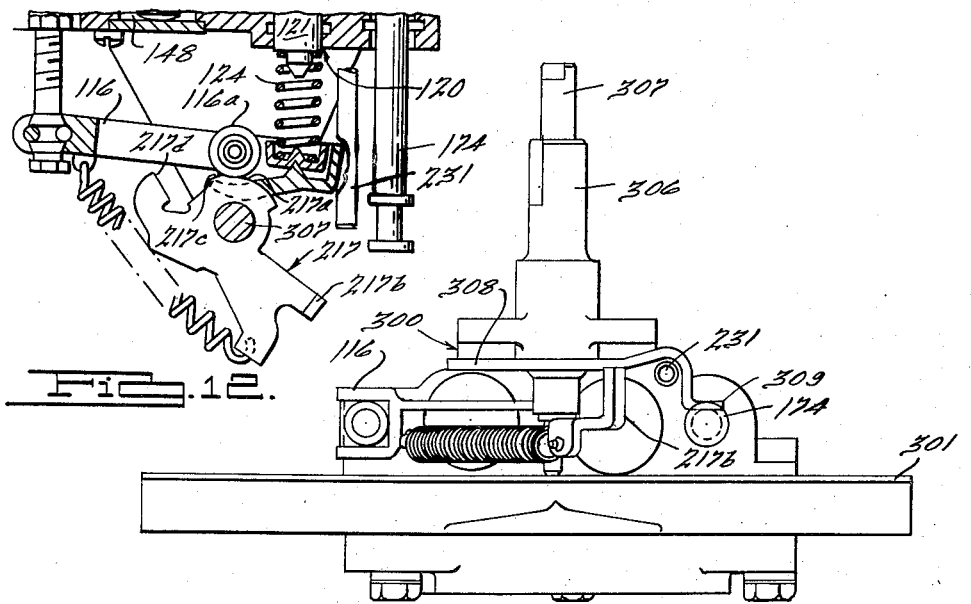
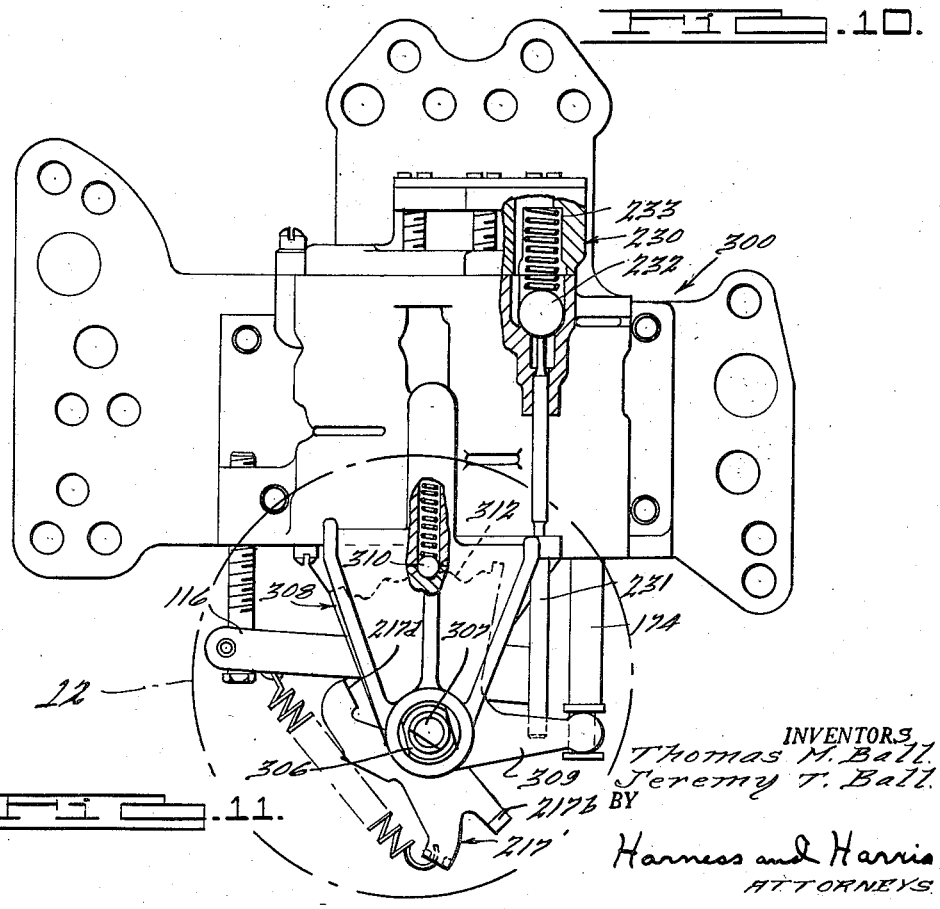

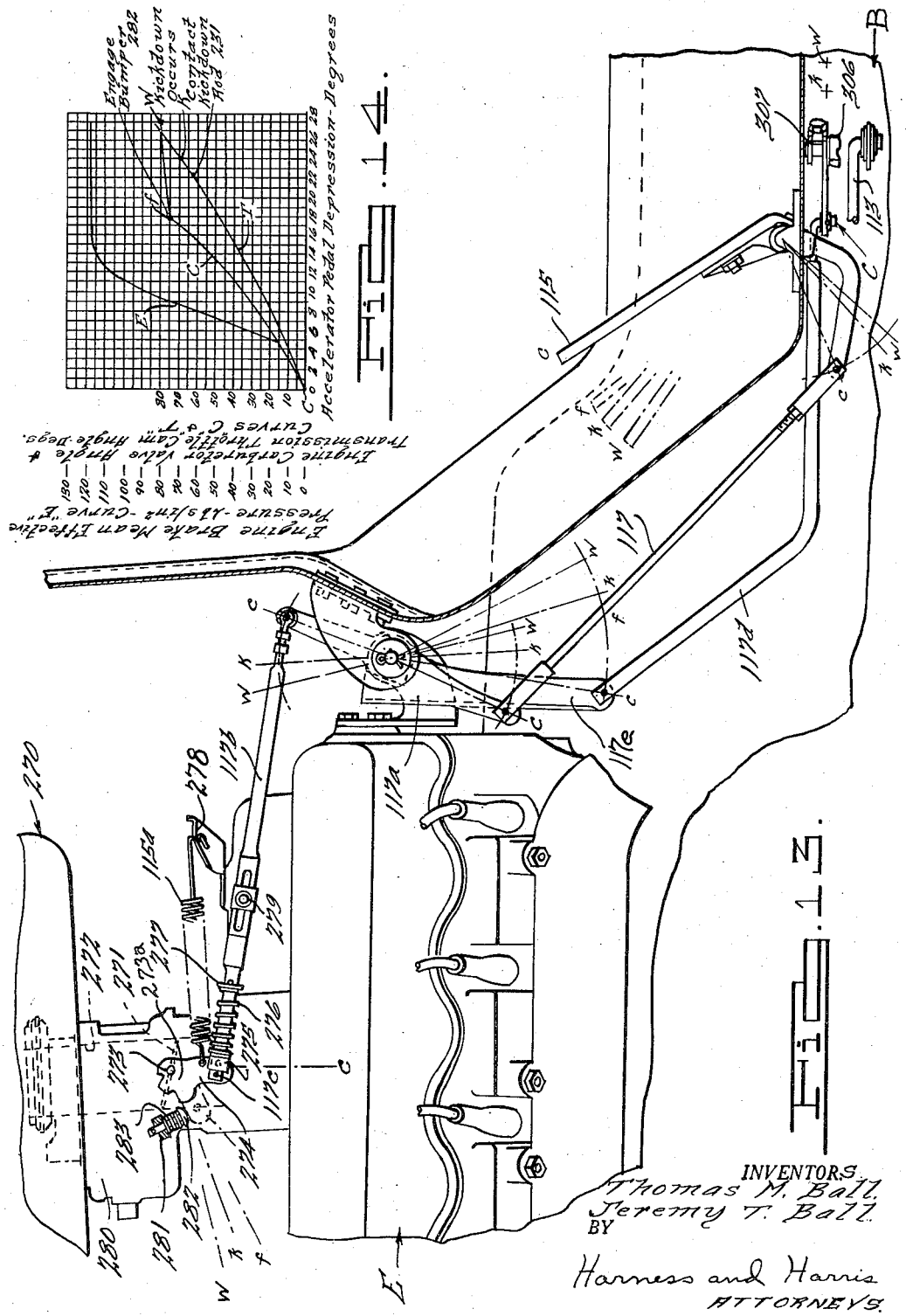

United States Patent Office 2,857,780
Patented Oct. 28, 1958

2,857,780

TRANSMISSION KICKDOWN CONTROL MECHANISM

Thomas M. Ball, Bloomfield Hills, and Jeremy T. Ball, Birmingham, Mich., assignors to Chrysler Corporation, Highland Park, Mich., a corporation of Delaware Application June 21, 1955, Serial No. 517,018

13 Claims. (Cl. 74—472)

This invention relates to accelerator pedal actuated kickdown or downshift control means for vehicle power transmission units and concerns primarily a means whereby the kickdown shift can be readily accomplished before depression of the accelerator to wide open throttle position and without any significant sacrifice of the engine torque that is available for direct drive.

It is a primary object of this invention to provide an accelerator pedal operated throttle valve control linkage that will provide for the optimum utilization of engine power prior to kickdown while assuring the occurrence of the kickdown prior to movement of the throttle valve to wide open throttle position.

It is still another object of this invention to provide an accelerator pedal operated throttle valve control linkage that permits use of an optimum, relatively small, arc of accelerator pedal movement between closed throttle and wide open throttle positions with substantially all of the throttle valve opening movement of the accelerator being reserved for engine power delivery prior to effectuation of a kickdown which will occur shortly before movement of the accelerator to wide open throttle position.

It is still another object of this invention to provide an accelerator pedal operated throttle valve control linkage that includes kickdown actuating mechanism that also serves as a means for damping out the transmission of engine vibrations to the driver control compartment.

It is still another object of this invention to provide an accelerator pedal operated throttle valve control linkage that includes relatively movable elements that permit wide variations in manufacturing and installation tolerances while insuring a very accurate control of the kickdown range in the extreme end portion of the throttle valve opening arc of movement.

It is a further object of this invention to provide an accelerator pedal operated throttle valve control linkage that insures effectuation of the transmission kickdown operation just prior to depression of the accelerator to wide open throttle position and wherein said linkage provides a much easier operating throttle valve control linkage due to the fact that a somewhat lighter accelerator return spring can be used with this type of throttle valve control linkage.

It is still another object of this invention to provide an accelerator pedal operated throttle valve control linkage having a transmission control mechanism associated therewith in which depression of said accelerator pedal will cause different speeds of operation to be transmitted to the throttle valve and to the transmission operating mechanism connected to the accelerator pedal, through at least a portion of the accelerator depression range of movement.

Other objects and advantages of this invention will become readily aparent from a consideration of the following description and related drawings wherein:

Fig. 1 is a schematic view of a motor vehicle drive train that includes a power transmission unit embodying this invention;

Fig. 2 is a sectional elevational view of the power transmission unit utilized in the disclosed drive train of Fig. 1;

Fig. 3 is an enlarged, fragmentary sectional, elevational view of the one-way brake mechanism associated with the guide wheel of the drive train torque converter device, the view being taken on the line 3—3 of Fig. 2;

Fig. 4 is a schematic line diagram of the power transmission unit shown in Fig. 2;

Fig. 5 is a diagrammatic sketch partly in section of the hydraulically operated control system for this transmission when the valving thereof has been set for the initiation of forward drive through the drive ratio and the valving is positioned in its downshifted or breakaway low ratio condition;

Fig. 6 is a fragmentary diagrammatic sketch partly in section of portions of the control valving shown in Fig. 5 when the control valving has been automatically upshifted from the Fig. 5 low speed condition to the condition for producing the forward direct drive ratio;

Fig. 7 is a fragmentary diagramatic view, partly in section, of portions of the central valving shown in Fig. 5 after the engine accelerator pedal has been sufficiently depressed to cause a kickdown from the upshifted direct drive condition of Fig. 6 to the forward underdrive ratio or breakaway condition of Fig. 5;

Fig. 8 is a diagrammatic view in side elevation of the shift positions of the drive ratio selector lever;

Fig. 9 is a plan view of the drive ratio selector lever shift quadrant;

Fig. 10 is an end elevation of the valve body that contains the several transmission control valves shown in Figs. 5–7;

Fig. 11 is a top plan view, partly in section of the control valve body shown in Fig. 10;

Fig. 12 is a sectional elevational view of the valve body shown in Figs. 10 and 11, the view showing structure included within the circle 12 of Fig. 11;

Fig. 13 is an enlarged, fragmentary, side elevational view, partly in section, of a vehicle power plant and transmission that has the throttle valve control linkage embodying this invention connected thereto; and Fig. 14 is a graph showing a conventional torque curve for a vehicle power plant, and curves showing throttle valve rotation and transmission throttle cam rotation for corresponding increments of movement of the power plant accelerator pedal.

Fig. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear wheels W of the vehicle.

Fig. 2 of the drawings discloses the power transmission unit structure that comprises an hydrokinetic torque converter device A and a change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the bolt means 10. The drive transmitting ring 9 is connected to the torque converter casing 13 which casing has an engine starter ring gear 11 fixedly mounted thereon and extending about the periphery of the casing 13. Within the converter casing 13 are mounted several vaned converter wheel elements, namely, the impeller or pump member 14, the turbine or runner member 15, and the guide or reaction member 17. A pair of guide wheels may be used in place of the single guide wheel 17 if so desired.

The vaned impeller wheel 14 is formed as an integral part of the converter casing 13 and is accordingly adapted to be rotatably driven by the driving shaft 8. Air circulating vanes (not shown) may be mounted on the exterior of the converter casing 13 to assist in cooling the converter contained fluid. Suitable air inlet and outlet ports (not shown) are provided in the housing 16 to permit passage of cooling air about the converter casing 13 during rotation thereof. The vaned turbine wheel 15 is drivingly connected by rivet means 19 to a radially extending flange portion 18b formed on a shaft hub member 18a. Shaft hub member 18a is drivingly connected by splines 18c to the forward end portion of the intermediate driven shaft member 18.

The intermediate shaft member 18 is adapted to transmit drive from the turbine member 15 of the torque converter device A to the planetary gearing of the gear box unit B that is arranged rearwardly of and in series with the torque converter device A. The forward end of intermediate shaft 18 is journalled in a bearing 20 that is piloted in an axially extending seat 13a formed in the hub of the torque converter casing 13. The intermediate portion of intermediate shaft 18 is rotatably supported by a sleeve plate 32 carried by the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the axially extending sleeve portion 32a of the sleeve plate 32. Sleeve plate 32 is fixed to and projects from the forward wall 42a of the relatively stationary gear box housing 42. The one-way brake 21 (see Fig. 3) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in Fig. 3.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through supply conduit 27 and circulates this oil through the converter A, the transmission unit lubricating system and the various subsequently described, hydraulically operated control mechanisms associated with this power transmission unit (see Fig. 5). A second pump 84, driven by the transmission output shaft 81, is also included in this transmission unit. The second pump 84, which draws oil from the sump 26 through the conduit 28, provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle.

The gear box B includes the direct drive clutch D and the pair of planetary gear trains 50 and 60 that are adapted to cooperate with the torque converter device A to provide means for the transmission of forward and reverse drives to the propeller shaft S, Fig. 1.

The sleeve plate 32, that is detachably mounted on the forward wall 42a of the gear box housing 42, includes a rearwardly directed, axially extending, sleeve-like flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate flange portion 32b, is positioned to extend between the piston 45 and an anchor ring 41 that is fixed to the portion 43b of the drum 43. Spring 40 continuously urges the piston 45 forwardly to a clutch disengaged position.

On admission of pressure fluid to piston bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 46 to its clutch disengaged position.

The forwardly positioned planetary gear train 50 that is adapted to be activated to provide means for transmitting a forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is rotatable about the intermediate shaft 18 and is arranged in meshing engagement with the planet pinions 52. Sun gear element 53 is carried by and drivingly connected at 59 to the backing plate member 47 of the direct drive clutch D. Accordingly, drive may be transmitted from shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the direct drive clutch D, is adapted to be applied to drum element 43a of clutch D to anchor the sun gear 53 of planetary 50 against rotation. Band 57 is applied to drum 43 by means of the servo mechanism 58 (see Fig. 5). Application of band 57 to drum 43 activates planetary gear train 50 for the transmission of a forward underdrive ratio from input shaft 18 to output shaft 81 by means subsequently described. The transmission of the forward underdrive ratio is through planetary gear trains 50 and 60 which function in a compounded relationship for the transmission of forward drive. The means utilized for the transmission of this forward underdrive ratio will become more apparent after reading the description of reverse drive planetary gear train 60.

Rearwardly positioned, reverse drive planetary gear train 60 includes the planet pinion carrier plate 51b that is connected to and supported by the drum-like planet pinion carrier element 51. Rotatably mounted on carrier plate 51b are a plurality (only one shown) of planet pinion gears 62. Planet pinion gears 62 are arranged in meshing engagement with the sun gear element 63. Sun gear 63 is drivingly connected to the intermediate shaft 18 through splines 56. In the construction disclosed, it will be noted that the sun gear 63 of the rear planetary gear train 60 is integral with the annulus gear 54 of the forwardly positioned forward drive planetary gear train 50. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the drum-like carrier member 51, is arranged to be engaged with carrier 51 to anchor the carrier 51 against rotation. Band 67 is applied to carrier 51 by means of the servo mechanism 68 (see Fig. 5). Application of band 67 to the planet pinion carrier 51, while direct drive clutch D is disengaged, will activate rear planetary gear train 60 for the transmission of a reverse drive from intermediate shaft 18 through sun and planet gears 63, 62 respectively to the annulus gear 64 which latter gear is drivingly connected to the output shaft. This specific gear box is not a part of the invention herein claimed.

With the power transmission unit herein disclosed it is possible to initiate forward drive through a high torque multiplication forward underdrive ratio that is automatically convertible into a fluid cushioned, forward direct drive at the most advantageous point depending on the driving conditions encountered. The final fluid cushioned direct drive ratio, being transmitted through the fluid of the torque converter A, is particularly suited for smooth downshifts to and upshifts from the torque multiplying underdrive ratio. This fluid drive transmitting arrangement reduces the possibility of engine stall at very low vehicle speeds while the transmission is set in the cruising direct drive ratio.

Whenever forward drive is to be initiated through the transmission, direct drive clutch D is initially disengaged and braking band 57 is applied to the clutch drum portion 43a to anchor the sun gear 53 of forward drive planetary gear train 50 against rotation. With sun gear 53 anchored against rotation the gear train 50 is activated and torque converter driven input shaft 18 causes the forward drive train annulus 54 to drive the pinion gears 52 and the pinion gear carrier 51 forwardly or clockwise. As a result of the pinion gear carrier 51 rotating clockwise the several planet pinions 62 of the reverse drive gear train 60 are carried forwardly and at the same time shaft 18 is driving the sun gear 63 of the reverse drive gear train 60 forwardly so that a compounded resultant forward drive is transmitted to the annulus gear 64 that is drivingly connected to the output shaft 81. Acceleration through the starting combination fluid and mechanically generated, torque multiplying, forward drive train continues until certain output shaft speed and torque conditions are achieved and then the transmission control system, subsequently described, automatically causes the brake band 57 to be disengaged from the drum flange 43a and the planetary direct drive clutch D to be engaged to then convert the torque multiplying forward underdrive into a direct drive. Release of band 57 and engagement of clutch D provides for the transmission of a substantially 1:1 ratio forward direct drive from input shaft 8 through converter A to the intermediate driven shaft 18 which latter shaft is directly connected to the output shaft 81 by the engaged direct drive clutch D. Engagement of clutch D on release of brake band 57 locks up two gears of the planetary gear train 50 so that gear train 50 transmits drive from shaft 18 to gear train 60 at a 1 to 1 ratio through the planet pinion gear carrier 51. As sun gear 63 of gear train 60 is also rotating at the speed of shaft 18 it is obvious that gear train 60 is also locked up for the transmission of forward drive at a 1 to 1 ratio. With the forward drive ratio hereinabove described, it is possible to get exceptional accelerating power due to the fact that the starting drive torque multiplication ratio of about 2.5 to 1 of the converter is combined with the torque multiplying ratio of approximately 1.7 of the forward driving compounded planetary gear trains 50, 60 and those ratios combine with an axle ratio of between 3.3 to 3.9 to 1 to give an overall starting ratio of between 13.4 and 15.8 to 1. It is thought to be quite obvious that such a transmission will give rocket-like acceleration when associated with some of the current high power motor vehicle engines.

Reverse drive may be obtained by applying brake band 67 to the carrier member 51 of the reverse planetary gear train 60, the clutch D and band 57 being disengaged at this time. Drive from input shaft 8 is then transmitted through the torque converter A to turbine driven intermediate shaft 18. Shaft 18 drives the sun gear 63 of the reverse drive planetary train 60 forwardly while pinion gear carrier 51 is being held by brake band 67. Accordingly, a combination fluid and mechanically transmitted torque multiplying reverse drive is transmitted to the annulus gear 64 of gear train 60. As annulus 64 is directly connected to the output shaft 81, a combination fluid and mechanically generated, torque multiplying reverse drive is transmittable from the input shaft 8 through the converter A and gear train 60 to the output shaft 81 when band 67 is applied to carrier 51 and clutch D and band 57 are released.

Drivingly connected to the output shaft 81 (see Fig. 2) by the pin 82 is a driving gear 83 of the gear oil pump 84. Oil pump 84 is arranged to draw fluid from the oil sump 26 through conduit 28 and to circulate the discharged pressurized fluid through the torque converter A and the hydraulically operated control and lubrication systems of the transmission unit. As aforementioned, pump 84 is operative whenever the output shaft 81 is rotating above a predetermined speed. Suitable valving, such as the line pressure regulator valve unit 185 shown in Fig. 5, is provided to insure that pump 84 automatically takes over the supply of pressure fluid for the transmission unit and its control system whenever the speed of output shaft 81 exceeds a certain predetermined relatively low value. This pressure regulator valving 185 is described in the co-pending application of William L. Sheppard, Serial No. 98,493, filed June 11, 1949, now U. S. Patent No. 2,697,363.

Also drivingly mounted on the output shaft 81 (see Figs. 2 and 5) is a speed responsive, centrifugal force operated, governor mechanism 85 which provides one of the means for automatically controlling operation of this power transmission unit. It is obvious that various types of vehicle speed responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted telescopically arranged weights 88, 89 for controlling actuation of the radially movable governor control valve 95 so as to provide a novel type of pressure fluid operated, output shaft speed responsive governor mechanism. This governor mechanism 85 is completely described in the said copending application of William L. Sheppard, Serial No. 98,493 filed June 11, 1949 now U. S. Patent No. 2,697,363.

While the pressure of the fluid discharged from the pump 84 into the governor inlet passage 97 is almost constant and also greater than the pressure of the fluid discharged from the governor mechanism into the governor outlet passage 98, due to the reducing valve action of governor piston valve 95, still it will be found that the pressure of the fluid discharged from the governor 85, hereafter denoted "governor" pressure, is roughly proportional to the speed of the output shaft 81. Governor 85 thus provides an efficient, accurate, simplified form of speed sensitive control mechanism.

The control system (see Fig. 5) for this transmission includes the manually operable drive ratio selector lever 111 which is rotatably mounted on the conventional motor vehicle steering shaft 112. Control lever 111 is connected by suitable linkage 113 and the rotatably mounted plate 308 to the manually operable drive ratio selector valve 170. Plate 308 has one arm 309 connected to the valve 170, another arm 311 is arranged to control the engine starter switch 114 so that the engine can be started only when the transmission is in Neutral, and another serrated portion 312 of the plate 308 is engaged by a spring pressed detent 310 to anchor the plate 308 in its selected position. Valve 170 has four drive ratio positions which are represented in the drawings by the letters R, N, DR and L respectively. These letters correspond to the Reverse, Neutral, Drive and Low ratios which ratios are selectively obtainable by manual shift of selector lever 111. The letter V associated with the valves 120, 140, 170, 185 and with other valve units of this control system, denotes a vent or drain port for returning the control system pressure fluid to the supply sump 26.

Pressure fluid from either of the supply pumps 25 or 84 is directed into the main supply conduit 191 which is connected to the inlet port of manually operable drive ratio selector valve 170. The pressure of the fluid in supply conduit 191 is controlled by the pressure regulator valve 185 and this controlled, substantially constant intensity, pump supplied pressure is denoted "line" pressure (usually 90 p. s. i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the Neutral position the valve lands 172 and 173 of its plunger or spool type valve element 174 close off the escape of pressurized "line" fluid from valve bore 171 and thus "line" pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, "line" pressure from one or the other of pumps 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the discharge conduit 194. Conduit 194 has associated therewith a check valve 197 that pressurizes the converter and prevents cavitation, frothing in the converter and/or blowing of the converter fluid into the sump 26 under abnormal conditions. Conduit 94 may be connected to a finned air or fluid circulating radiator-type converter fluid cooling unit 196. The converter pressure regulator valve 195 and the check valve 197 cooperate to maintain a pressure of approximately 50 to 60 p. s. i. in the converter at all times when the engine is operating or the vehicle is in motion.

In either of the forward drive ratio positions DR (Figs. 5 and 6), or L (Fig. 7) of the drive ratio selector valve element 174, "line" pressure fluid from supply conduit 191 will always be directed through the bore 171 of valve unit 170 and into the conduits 119, 119a that connect the manual drive ratio selector valve unit 170 with the torque controlled or torque responsive throttle valve unit 120. Consequently a form of torque responsive control is always available to cooperate with the driven shaft speed responsive governor 85 to conjointly control automatic operation of this transmission unit in all forward drive ratios. "Line" pressure passed to conduit 119 whenever the ratio selector valve 170 is in either Drive or Low ratio also fills conduit 119b and is passed into conduit 160 for transfer to the "apply" side chamber 58b of the servo 58 for forward drive train 50. Thus planetary 50 is activated for the forward underdrive whenever valve unit 170 is set for Drive or Low and all starts will be through the underdrive initially.

The torque responsive throttle valve unit 120 (see Fig. 5) has operably associated therewith a kickdown valve-controlled mechanism 230 that is hereinafter described. The torque responsive throttle valve 120 is operated by linkage 116, 117 connected to the throttle control or accelerator pedal 115 for the engine unit E that drives this power transmission unit. Pedal 115 is connected by linkage 117 to the rotatable cam 217 that is adapted to activate the pivotally mounted lever linkage 116. The piston type throttle valve element 121 of valve unit 120 is arranged to be reciprocated by oscillation of the linkage 116. Throttle valve unit plunger element 121 is arranged to reciprocate in the bore 123 of the valve unit 120 and it is connected to the actuating linkage 116 through a compression spring 124. At closed or idle throttle position of the accelerator pedal 115 with the manual control valve 170 set for either of the forward drive ratios, DR or L, the arrangement of the plunger valve 121 in bore 123 of valve 120 is such as to permit pressurized fluid to seep from the supply conduit 119a into and through valve 120 to the conduit 125 and then into branch conduits 125a and 125b. The pressure of the fluid passing out of valve 120 will be lower than that of the "line" pressure supplied thereto due to the reducing valve action of valve 120. This reduced or compensated "line" pressure supplied to conduits 125, 125a and 125b is denoted "throttle" pressure hereafter.

The "throttle" pressure admitted to the branch conduit 125b from valve 120 is passed into branch conduit 144 and through a restriction orifice 143 in conduit 144 and then into the bore chamber 145 located at the right end of the valve bore in valve unit 140. Valve unit 140 reciprocably mounts the multiple land plunger valve 147. It is thought to be obvious that the "throttle" pressure admitted to bore chamber 145 will apply a throttle responsive force to the right end of valve 147 which force will tend to shift the valve 147 towards the left end of valve unit 140.

In addition to the force of the "throttle" pressure acting on the right end of valve 147, there is a spring generated force constantly applied to the right end of valve 147 that also tends to shift the valve 147 towards the left end of the valve unit 140. The spring generated force results from the mounting of the precompressed spring 149 in the right end of bore 145 so that it acts to urge valve 147 leftward at all times.

At the left end of the valve unit 140 is a chamber 148 that is connected by the conduit means 98 to the outlet from the hydraulic governor 85. Conduit 98 pressurizes the valve bore chamber 148 of valve unit 140 with a "governor" pressure fluid in which the fluid pressure intensity is proportional to the speed of the transmission output shaft 81. It is thus thought to be apparent that a rightwardly directed force will act upon the left end of valve 147 that is proportional to the speed of the vehicle and this "governor" pressure generated force will tend to shift the valve 147 towards the right end of valve unit 140.

Thus it will be seen that the pressure differential between the "throttle" responsive pressure fluid and the spring 149 applied to the right end of valve 147 and the "governor" pressure fluid applied to the left end of valve 147 effects reciprocating movement of the valve 147 within valve unit 140. At relatively low output shaft speeds with an open throttle the force of the "throttle" pressure in chamber 145 plus the force of spring 149 is greater than the force of the "governor" pressure in chamber 148 and the valve 147 is automatically positioned substantially as shown in Fig. 5. As the output shaft speed increases a point is reached where the "governor" pressure in chamber 148 exerts a rightwardly directed force on the left end of valve 147 that overcomes the leftwardly directed force of the "throttle" pressure and the spring 149 on the right end of valve 147 and then valve 147 shifts toward the right to a position such as that shown in Fig. 6. This differential pressure generated shift of the valve 147 is utilized to alternately connect and disconnect the "line" pressure conduits 119 and 155 (see Figs. 5 and 6) and thereby automatically control operation of the direct drive clutch D and the control servo 58 for the forward underdrive braking band 57 as will be clearly brought out hereafter. It should be pointed out at this time that the diameter of the left end of valve 147 is greater than the diameter of the right end of valve 147; thus, the intensity of the "governor" pressure in chamber 148 need not actually exceed the intensity of the "throttle" pressure in chamber 145 in order to effect a rightward shift of the valve 147. It is the differential forces produced by the opposed "throttle" and "governor" pressures in combination with the force of spring 149 that dictate the shifts of valve 147. Furthermore, it is thought to be obvious that the points of shift of valve 147 will vary considerably depending on the degree of throttle valve opening as well as the particular output shaft speed at any given time. A more detailed description of the shift valve unit 140 and its manner of operation is contained in the co-pending application of J. T. Ball et al., Serial No. 268,274, filed January 22, 1952.

Automatic, and substantially simultaneous, operation of the direct drive clutch D and the servo 58 for the forward drive planetary brake band 57 is accomplished by the reciprocatory shift of valve 147. It will be noted that "line" pressure, which is a relatively high, constant intensity, pump supplied, pressure fluid (90 p. s. i.) is conducted to the inlet port 150 of shift control valve unit 140 by the conduit 119. "Line" pressure is supplied to conduit 119 by the pumps 25 and/or 84 whenever the drive ratio selector valve 170 is set for either of the forward drive ratios DR or L respectively. At relatively low output shaft speeds (see Fig. 5) with the valve 170 set for Drive, the "throttle" pressure in bore 145 at the left end of valve 147 will position the intermediate land 147c of valve element 147 across the "line" pressure inlet port 150 to prevent the transfer of "line" pressure fluid from conduit 119 through the bore of valve 140 and out into the conduit 155. Conduit 155 has branch conduits 155b and 155c that are connected respectively to the "apply" bore 44 of the direct drive clutch D and to the "release" chamber 58c of the servo 58. Thus whenever the transmission ratio control valve 170 is set for Drive and shift valve 147 is in the position shown in Fig. 5 then "line" pressure is not admitted to the valve bore of valve 140 or to conduit 155 from the supply conduit 119 and drive will be through the torque converter A and the compounded forward underdrive gear trains 50, 60 due to direct drive clutch D being disengaged and brake band 57 being applied. Likewise, whenever the shift valve 147 is moved to the right to the position shown in Fig. 6, "line" pressure will be transferred from conduit 119 through valve port 150 to conduits 155, 155b and 155c and accordingly direct drive clutch D will be applied and brake band 57 released so that a forward drive is then transmitted through the torque converter A and the locked up gear trains 50, 60 whereby a direct drive of almost a 1 to 1 ratio is transmitted to the output shaft 81. Automatic upshifts and downshifts between the direct drive and the underdrive ratios are accomplished by the hydraulically actuated, automatic, snap action shifting of the valve 147 with changes in the differential pressures or forces applied to opposite ends of the valve 147 due to the opposed "throttle" and "governor" pressures and the spring force applied to the valve element 147. In addition, driver controlled downshifts or kickdowns from the direct drive to the starting underdrive ratio can be accomplished by driver depression of the accelerator pedal 115 to a predetermined open throttle position such that the kickdown valving 230, previously mentioned and subsequently described with regard to Fig. 7, is brought into operation to accomplish the kickdowns or downshifts. This invention relates to the means for accomplishing kickdowns with the minimum sacrifice of engine power.

Admission of "throttle" pressure fluid (see Fig. 5) to conduit 125, on opening of the engine throttle by accelerator depression, not only pressurizes conduit 125, branch conduit 125b, and conduit 144 so as to apply throttle pressure to the chamber 145 of direct clutch control valve 140, but in addition, it also pressurizes the branch conduit 125a that is connected to bore chamber 131 in the right end of the shuttle valve unit 130. Shuttle valve 130 (see Figs. 5 and 6) is a mechanism that insures smooth, quick, speed ratio changes and it is more completely described in William L. Sheppard pending application Serial No. 254,531, filed November 2, 1951. The shuttle valve 130 forms no part of the invention claimed herein so further description thereof is considered unnecessary.

From consideration of Figs. 5–7, it is thought to be apparent that on movement of the drive ratio control valve element 174 from the Neutral to either the Drive or Low forward drive positions, that "line" pressure fluid will flow from supply conduit 191 through the drive ratio control valve 170, then through the conduits 119 and 119c to the shuttle valve 130. At low vehicle speeds the "line" pressure in conduit 119c passes through the shuttle valve 130 and out into branch conduit 119b. "Line" pressure may pass from the branch conduit 119b through the servo restrictor valve 240 and then into conduit 160 so as to apply the "line" pressure to the "line" pressure chamber 58b on the "apply" side of the forward underdrive planetary servo 58. Application of "line" pressure to chamber 58b of servo 58 applies the brake band 57 to drum 43 so as to activate the gearing 50, 60 of planetary gear box B for the transmission of the starting forward underdrive.

At closed or idle throttle (see Fig. 5) the throttle actuated valve 120 is substantially closed to prevent the supply of any significant "throttle" pressure to the conduit 125 and the branch conduits 125b and 125c. Accordingly, at closed throttle there is no significant "throttle" pressure transmitted from conduit 125 to the "throttle" pressure chamber 58a that is also on the "apply" side of forward drive servo 58. Thus at closed throttle there is no significant "throttle" pressure in servo chamber 58a assisting the "line" pressure in chamber 58b to apply the forward underdrive brake band 57 to drum 43. However, as soon as the accelerator 115 is depressed to accelerate in forward drive, then "throttle" pressure of a progressively rising intensity is passed through valve 120 and conduit 125 to the chamber 58a on the "apply" side of servo 58 to assist the "line" pressure in chamber 58b in anchoring the brake band 57 to the drum 43. With the disclosed arrangement it is apparent that as the load is applied to the output shaft 81 is increased, the accelerator 115 must be further depressed to increase the torque to overcome the load. Depressing the accelerator opens throttle valve 120 and increases the intensity of the "throttle" pressure transmitted to line 125 and to servo chamber 58a so that brake band 57 will be anchored by means that hold in proportion to the load applied. This results from the fact that the variable "throttle" pressure band applying force in servo chamber 58a supplements and assists the constant intensity "line" pressure band applying force in chamber 58b.

From a consideration of Figs. 5–7 it will be noted that the right end of the plunger type shift valve element 147 of valve 140 is pierced by an axially extending counterbore 151. This counterbore 151 is crossed by a transversely extending crossbore 152 in the neck region between the two valve lands 147a and 147c at the right end of valve 147. The counterbore 151 thus not only provides a seat for the valve spring 149 at the right end of the valve 147 but in addition it cooperates with the crossbore 152 to provide a conduit means for transferring or transmitting pressurized fluid between the valve bore chamber 145 at the right end of the valve unit and the portion of valve bore located between valve lands 147a and 147c. This conduit means composed of the valve bores 151 and 152 is an essential part of the shift valve unit structure that provides for snap action shift of the shift valve element 147 as explained in detail in the aforementioned pending J. T. Ball et al. patent application, Serial No. 268,274, filed January 25, 1952.

Connected to the valve bore of valve unit 140 between the right end bore chamber 145 and the "line" pressure inlet conduit 119 is a vent conduit 154. Conduit 154 is connected through conduits 219, 219c and restriction orifice 163 to the kickdown valve unit 230. Kickdown valve unit 230 includes a spring supported, ball-type, valve element 232. The operation of the ball-type kickdown valve element 232 will be completely described subsequently when Fig. 7 is referred to in detail.

Shift valve vent conduit 154 is connected by a restriction orifice 166 to the "line" pressure supply line 219a. "Line" pressure supply conduit 219a is connected by conduit 219 to the Low port of the drive ratio selector valve 170. Accordingly, whenever the drive ratio selector valve 170 is set for the Low ratio drive, conduits 219, 219a and 219b are supplied with "line" pressure of approximately 90 p. s. i. At all other times the conduits 219, 219a and 219b are disconnected from the several pressure fluid supply sources and merely provide a drain conduit means that empties into the pressure fluid supply sump 26 through the vent port V at the left end of valve unit 170. Conduit 219a is connected to the inner end of the chamber 148 at the left end of valve unit 140. With the arrangement shown it is possible to pressurize the inner end portion of the chamber 148 of valve unit 140 with "line" pressure whenever the valve 170 is set for the Low ratio drive. Accordingly, the "governor" pressure that is normally directed into the outer end of the valve chamber 148 at the left end of valve unit 140 will be unable to upshift the valve 147 towards the right and the transmission control system will be locked in the Low drive ratio.

From the above description of the differential pressure, bleed-type, unit shift valve 140 it will be found that the "throttle" pressure supplied to valve unit 140 through connected conduits 125, 125b, 144 is controlled by three restriction orifices 143, 163 and 166 respectively and by the movement of the reciprocable, plunger-type, valve element 147 that is positioned between the orifices 143 and 166. When the drive ratio selector valve 170 is in Neutral with the engine operating, the lands 172, 173 of drive ratio control valve 174 will be located such that "line" pressure cannot be supplied to conduits 119, 119a, 119b and 119c. Accordingly, forward drive low servo 58 cannot apply band 57 to activate the gear trains 50, 60 for the transmission of a forward drive. Likewise, "line" pressure cannot be passed through valve 170 to the conduit 225 to cause servo 68 to apply band 67 so as to activate gear train 60 to provide for the transmission of a reverse drive.

If the drive ratio selector valve 170 is set for Drive as shown in Figs. 5, 6 and 7 then "line" pressure is supplied to conduits 119, 119a, 119b and 119c, as well as to conduit 160, and then servo 58 will apply band 57 and condition the gearing 50, 60 for a starting forward underdrive ratio. Prior to movement of the vehicle in the Drive ratio, the shift control valve 147 will still be positioned as shown in Fig. 5 and "throttle" pressure, which may vary from 15 p. s. i. to 90 p. s. i. is passed through conduits 125, 125b, through conduit 144 and restriction orifice 143 into bore chamber 145 at the right end of valve unit 140. "Throttle" pressure admitted to the bore chamber 145 at the right end of valve 140 also passes into the bores 151, 152 of the valve element 147. Prior to movement of the vehicle "governor" pressure is not directed into valve bore 148 at the left end of valve unit 140 so that valve 147 remains in the downshifted position shown in Fig. 5 due to the action of the forces of the spring 149 and the "throttle" pressure applied to the right end of valve element 147. In the Fig. 5 downshifted position of valve 147, the "throttle" pressure in valve bore chamber 145 cannot pass through the valve and out into vent conduit 154 for the valve land 147a covers the outlet port to conduit 154. However, as the vehicle begins to move forward in the forward downshifted or underdrive ratio with opening of the throttle valve 120 by accelerator depression, an increased "throttle" pressure is supplied to valve bore chamber 145 at the right end of valve 140 and an increasing "governor" pressure is supplied to valve bore chamber 148 at the left end of shift valve 140. As the vehicle speed increases the "governor" pressure supplied to the chamber 148 at the left end of valve 140 produces a force on the left end of valve 147 that overcomes the combined forces of the spring 149 and the "throttle" pressure applied to the right end of valve 147 and then the valve 147 begins to shift towards the right. After a predetermined rightward movement of the valve 147, due to the predominant force of the "governor" pressure in chamber 148, the valve land 147a will uncover the vent port to conduit 154 and permit the "throttle" pressure in bore chamber 145 to pass out through the valve bore into the vent conduit 154. The pressurized fluid passed into conduit 154 is passed through the restriction orifice 166 and then out into the drain conduits 219a, 219 that drain through the open vent V at the left end of valve 170 if valve 170 is set for Drive. It will be seen then that the "throttle" pressure applied to the right end of the valve 147 during accelerator depression, is drained to sump 26 through the pair of series arranged, substantially identical, restriction orifices 143, 166 after a predetermined rightward shift of the valve 147 by the force of the "governor" pressure applied to valve bore chamber 148 at the left end of valve 147. On uncovering of the vent conduit 154 by rightward shift of valve 147, the pressure of the fluid throttle pressure fluid in valve bore chamber 145 is reduced to approximately one-half (½) its former value due to the escape of this pressurized fluid through the series arranged orifices 143, 166 so immediately the "governor" pressure force applied to the right end of valve 147 overcomes the reduced resultant force of the "throttle" pressure applied to the left end of valve 147 and the valve 147 is snapped towards the left to the upshifted position shown in Fig. 6. This is explained in considerable detail in the aforementioned J. T. Ball et al. application Serial No. 268,274.

Based upon the description of the upshift action of the valve 147, it is thought to be more or less apparent that the automatic downshift of the drive ratio shift control valve 147, from its Fig. 6 position to its Fig. 5 position, is accomplished as a result of action just the reverse of that which occurs during automatic upshift. Considering first Fig. 6, which shows the valve 147 in its upshifted position, it will be noted that valve land 147a then covers "throttle" pressure inlet port 177 from conduit 144 so that "throttle" pressure cannot enter the valve chamber 145. Accordingly, the compressed spring 149 provides the only force acting on the right end of the valve 147 that tends to downshift the valve 147 towards the left. At this time the force of the "governor" pressure in the chamber 148 at the left end of valve 147 is opposing the force of the compressed spring 149 at the right end of valve 147 and these are the only axially directed forces acting on the valve 147. As the vehicle speed decreases the "governor" pressure will automatically decrease and eventually the force of the spring 149 will overcome the force of the "governor" pressure so that the valve 147 will begin to shift towards the right. After a predetermined rightward shift from the Fig. 6 upshifted position of valve 147, the valve land 147a will uncover the "throttle" pressure inlet port 177 from conduit 144. When the "throttle" pressure inlet port 177 is initially uncovered by leftward shift of valve 147, the "throttle" pressure from conduit 144 passes into the chamber 145 at the right end of valve unit 140 and through the valve bores 151 and 152 and out through the vent conduit 154 and thence through the restriction orifice 166 into the drain conduit 219a. Thus on uncovering of "throttle" pressure inlet port from conduit 144 the pressure of the fluid admitted to the aforementioned conduit path between the series arranged restriction orifices 143 and 166 is raised from zero to approximately one-half (½) the "throttle" pressure then existing in the conduit 125b on the downstream side of the restriction orifice 143. As a result of the uncovering of the "throttle" pressure inlet port by the initial rightward shift of valve 147, the force of the newly developed "differential" pressure trapped between orifices 143, 166, which is equal to one-half (½) of the "throttle" pressure intensity is suddenly added to the force of the compressed spring 149 and thus a suddenly increased force is applied to the right end of valve 147 to effect a snap action downshift of valve 147 towards the left end of valve bore 146. At the completion of the downshift of valve 147 the valve 147 is located in the bore 146 in the position shown in Fig. 5. At this time the valve land 147a is covering the escape port to conduit 154 so now the bleed of the "differential" pressure from chamber 145 through the restriction orifice 166 to drain 219a is terminated and full "throttle" pressure builds up in the chamber 145 at the right end of valve 147. After downshift of valve 147 to the Fig. 5 position, the force acting on the left end of valve 147 is again the force of full "throttle" pressure plus the force of the spring 149. The force of the "governor" pressure applied to valve chamber 148 at the left end of valve 147 must overcome both of the existing forces applied to the right end of valve 147 in order to initiate upshift of valve 147 to the Fig. 6 direct drive position. A very important feature of this automatic shift control valve 140 is the arrangement whereby false or unintended downshifts from the direct drive (Fig. 6) to the underdrive position (Fig. 5) are prevented when the throttle valve 120 is suddenly opened by an accelerator depression. It will be noted that when the valve 147 is upshifted (Fig. 6) that the "throttle" pressure inlet port 177 to valve 140 from conduit 144 is covered by valve land 147a so opening the "throttle" valve 120 does not automatically admit throttle pressure to bore 145 or increase the force applied to the right end of valve 147 that tends to downshift the valve 147 to the left to its figure position. On the contrary only the force of the spring 149 at the right end of valve 147 opposes the force of the "governor" pressure applied to the left end of the valve 147 when valve 147 is in its upshifted position. When the vehicle speed has dropped sufficiently to permit spring 149 to shift valve 147 to the left enough to uncover "throttle" pressure inlet port 177, then the automatic downshift occurs. This feature of the valve 140 prevents unnecessary upshifts and downshifts of the transmission, eliminates engine racing and tends to improve transmission performance as well as increase transmission life.

It will be noted from a consideration of Fig. 6 that as the valve 147 is moved towards the left to initiate downshift that after a very slight rightward movement the "throttle" pressure inlet port is uncovered and that immediately the so-called "differential" pressure will develop in valve bore chamber 145. While a slight rightward movement of the valve 147 uncovers the "throttle" pressure inlet port 177 still this same rightward movement does not close off the "line" pressure supply port 150 for the clutch D or open the vent port 169 for the "line" pressure conduit 155. As a result of this design of the valve unit 140 the snap action "differential" pressure force can fully develop in bore chamber 145 before the direct drive clutch D is released and the underdrive brake band 57 applied and thus undesirable slipping of these friction elements is prevented.

It is thought to be quite clear that the shift of valve element 147 between its downshifted (Fig. 5) and upshifted (Fig. 6) positions controls the passage of "line" pressure fluid from the "line" pressure supply conduit 119 through the valve bore of shift valve unit 140 to the conduit 155 which connects to the "apply" bore 44 of the direct drive clutch D and the "off" chamber 58c of the forward underdrive control servo 58. Likewise, shift of valve 147 controls the venting of the "line" pressure fluid supplied to the conduit 155 for the movement of valve land 147d across the vent port 169 controls drain of the "line" pressure fluid from clutch D and servo chamber 58c back into the supply sump 26 through the vent port 169.

The aforementioned description of the operation of shift control valve 140 covers the normal automatic operation of the transmission control system when drive is initiated through the usual forward, starting Drive ratio. From an inspection of Figs 8 and 9, as well as Fig. 5, it will be noted that in addition to the Drive position, which gives an automatic two-speed forward drive, another forward starring drive ratio, namely Low, is also provided and this Low ratio is also under the control of the shift control valve 140. Low ratio is utilized particularly for starting drive under extremely difficult circumstances. This Low ratio drive would be used when it might be desirable to rock the vehicle by quickly shifting between the Low and Reverse drive ratios. A consideration of Fig. 8 shows that the Low and Reverse positions of the ratio control lever 111 are in the same plane so such a shift as between Low and Reverse can be quickly and easily accomplished. Low ratio is also available for use as a coasting ratio when descending steep hills or the like. When the transmission control system is to be set for Low the shift quadrant 250 and this shifts the drive ratio control valve 174 to the position shown in Fig. 7. As will be seen from the subsequent description, the shift control valve 147 will then be pressurized with "line" pressure in such a manner that it will be locked in the downshifted position shown in Fig. 5. In this, Low ratio, drive is always through the torque converter A and the compounded underdrive gear trains 50, 60 of the gear box B. The drive transmitting train in Low is the same as the normal starting drive train employed when starting in the Drive ratio. However, when starting in the Low ratio, provision is made in the control valving to prevent any automatic upshift of valve 147 to attain the direct drive ratio that would be achieved upon the engagement of the clutch D when the bands 57 and 67 are released.

Fig. 7 shows the condition of the elements of valve units 120 and 140 immediately after the accelerator pedal 115 has been depressed to substantially its limit of throttle valve opening movement to effect a kickdown from direct drive (Fig. 6) to the Low ratio which is also the breakaway drive (Fig. 5). In many instances while travelling along in the cruising direct drive of the Drive ratio (Fig. 6) it may be necessary or advantageous to effect an immediate downshift to the underdrive ratio (Figs. 5 and 7) in order to get a more favorable accelerating ratio. This shift may be readily accomplished by merely depressing the accelerator 115 to a point approaching the wide open position of the carburetor throttle or at least depressing the accelerator to a position corresponding to within the last five (5) or ten (10) degrees of wide open position of the engine throttle valve. On depressing the accelerator 115 to the aforementioned end portion of its movement range, the linkage 117 (see Figs. 7, 13) will rotate cam 217 counterclockwise and cause the finger 217b of cam 217 to engage the plunger rod 231 of the kickdown valve 230 and move rod 231 towards the right (see Fig. 7). Movement of plunger rod 231 to the right will cause it to unseat the ball-type valve 232 of kickdown valve assembly 230 and permit "throttle" pressure fluid of maximum intensity (approx. 90 p. s. i.) in chamber 233 of valve 230 to enter the conduit 219c and then pass through the restriction orifice 163 into the conduit 154 (see Fig. 6) that connects with the port 153 of the valve bore. "Throttle" pressure passing through port 153 into the valve bore of valve unit 140 (see Fig. 6) enters the bores 152 and 151 respectively of the shift control valve 147 and is passed therethrough into the chamber 145 at the right end of valve 147. Thus with a sudden full depression of the accelerator 115, the force developed by the compensated "throttle" pressure fed through opened kickdown valve 232 is applied to the right end of valve element 147 to assist the spring 149 in downshifting the valve 147 toward the left. The pressure fluid fed through opened kickdown valve 232 and supplied to the chamber 145 at the right end of the valve 147 of shift valve unit 140 is a compensated "throttle" pressure, the pressure of which is dependent on the sizes of the series arranged restriction orifices 163 and 166. It will be noted that when kickdown valve 232 is unseated by the plunger rod 231 that the "throttle" pressure fed through restriction orifice 163 not only passes into the chamber 145 of the valve bore 146 but in addition it passes through the restriction orifice 166 and out through the drain conduit 219a to sump 26. Here again is a pair of restriction orifices arranged in series and the resulting pressure of the compensated "throttle" pressure fluid trapped between the orifices 163 and 166 can be calculated in the manner set forth in the Ball et al. application 268,274 relative to the calculation of the pressure of the differential "throttle" pressure fluid trapped between the restriction orifices 143 and 166 during normal upshifts and downshifts when operating in the Drive ratio. As a kickdown is accomplished by depression of the throttle valve accelerator 115 to the latter part of its movement range it is obvious that the "throttle" pressure fed to the kickdown valve chamber 233 at this time will be at about its maximum value and substantially equal to the "line" pressure which is normally about 90 p. s. i. The differential or compensated "throttle" pressure fluid fed into the valve bore chamber 145 of valve unit 140 during a kickdown will normally be somewheres between one-half and full "throttle" pressure depending on the relative sizes of the orifices 163 and 166. It is thought to be obvious that the intensity of the differential pressure applied to valve bore chamber 145 during a kickdown can be readily varied by varying the sizes of the orifices 163 and 166. Furthermore, by a consideration of the valving 140 and its method of functioning, it is thought to be apparent that the ratio of the sizes of the orifices 163 and 166 will control the upper limit or maximum vehicle speed at which a kickdown may be accomplished. As the sizes of the orifices 163, 166 control the pressure of the differential fluid supplied to chamber 145 during a kickdown, they thus control the force applied to the right end of the valve 147 and this force must be such that when it is combined with the force of the spring 149 it will overcome the force of the "governor" pressure applied to the left end of valve 147 in order to effect a kickdown of the valve 147. With the orifice sizes that have been used in transmissions embodying this type of control system, kickdowns can be secured up to approximately 55–60 miles per hour when the transmission is operating in the Drive ratio. It will be noted from a consideration of Fig. 7 that the kickdown valve unit 230 is designed such that it tends to prevent an accidental kickdown during normal accelerator depression. As the accelerator 115 is depressed it normally acts against the force of its return spring 115a (see Figs. 5 and 7) and against the force exerted by the "throttle" pressure fluid in the chamber 123a at the right end of valve 120. However, after the accelerator 115 has been moved to the latter portion of its throttle opening movement, the finger 217b of throttle cam 217 engages rod 231 and moves it against the kickdown valve 232. Valve 232 is held on its seat by the spring 234 and by the force exerted by the "throttle" pressure fluid in the chamber 233 of kickdown valve 230. Thus to accomplish the kickdown a sufficient additional force must be applied to the accelerator 115 to overcome the force of the "throttle" pressure in the chamber 233 and the spring 234 in addition to that required to normally depress the accelerator.

Reverse drive (see Fig. 5) is obtained by manually shifting the drive ratio selector valve 174 to the right so as to connect "line" pressure supply conduit 191 with the reverse drive pressure fluid supply conduit 225. Pressurizing conduit 225 activates servo 68 and applies the reverse drive brake band 67. Reverse servo 68 includes a pressure fluid operated switch 238 that is connected to a vehicle electrical energy source, such as the battery, and to the conventional "back-up" lights 239. When reverse servo 68 is pressurized then the "back-up" lights 239 are automatically energized.

Valve body 300 (see Figs. 2 and 10–12) includes suitable bores and conduits to provide all of the valving shown diagrammatically in Fig. 5. The functions of the servo restrictor valve 240 and the throttle pressure check valve 260, have not been described in connection with this invention for they are not directly connected with this invention. These valves are described in detail in the copending application of J. T. Ball, Serial No. 477,870 filed December 27, 1954. Driver operation of the several driver operable valves 120, 170, 230 is accomplished through actuation of a pair of relatively rotatable shafts 306 and 307 that are concentrically arranged within the valve body 300. From an inspection of Figs. 5 and 13 it will be noted that suitable linkage 113 and 117 is connected respectively to each of these rotatable shafts 306 and 307 such that movement of the drive ratio control lever 111 and the accelerator 115 will respectively operate linkages 113 and 117. Movement of the drive ratio control lever 111 causes linkage 113 to rotate the shaft 306 and turn the attached lever plate 308 in an arc about shaft 306. Lever plate 308 has a finger 309 that is engaged with the drive ratio control valve element 174 so that movement of lever 111 will control the position of valve 174 within the bore in the valve body 300. A spring detent mechanism 310 is provided to lock the lever plate 308 in each of its selected positions. Likewise, the accelerator pedal 115 is connected by the linkage 117 to a pivoted lever plate 117a that is connected by the lever 117b (see Fig. 13) to the engine carburetor throttle valve 271. Linkage 117 is also connected through the lever plate 117a and a directly connected pivoted lever 117e to the linkage 117d. Linkage 117, 117a, 117e, 117d thus directly connects the accelerator 115 to the shaft 307 of valve body 300 such that depression of the accelerator 115 will cause rotation of the shaft 307 counterclockwise. Cam plate 217 is drivingly connected to the shaft 307 and thus it is thought to be obvious that depression of accelerator 115 will cause the cam surface on edge 217a of plate 217 to actuate the pivoted lever linkage 116 and operate the throttle responsive valve element 121 of the throttle valve 120. As cam plate 217 carries the finger element 217b, it is thought to be obvious that an accelerator depression to about the last five degrees of throttle valve opening movement will move the finger 217b of plate 217 into engagement with the kickdown valve push rod 231 and actuate the rod 231 such that it will unseat kickdown control valve 232 and apply a compensated "throttle" pressure to chamber 145 of shift valve 140 so as to effect the kickdown downshift of the valve 147 to the underdrive position shown in Fig. 7.

Before describing Fig. 13, which discloses the core of this invention, it would be advantageous to point out some of the major disadvantages of kickdown controls that have been used heretofore with a number of power transmission units of the general type herein disclosed. Certain transmission control systems are arranged such that the kickdown can not be effected until the accelerator pedal has been moved beyond the wide open throttle position. Such an arrangement requires an unnecessarily large amount of accelerator pedal movement between the closed throttle position and the kickdown position and this relatively wide angle pedal movement can be tiresome and awkward for the vehicle operator. Furthermore, with this enlarged pedal travel movement, the accelerator projects above the driver compartment floor to a considerable extent and also the increased pedal travel may raise linkage problems that would not be present with an accelerator travel of a smaller arc. While the aforementioned disadvantages are not present in an accelerator kickdown construction wherein the kickdown is effected by accelerator movement to some position before wide open throttle position, still, there may be certain other disadvantages with the reduced angle arrangement. If the kickdown is effected by depression of the accelerator to a position approaching, but in advance of, wide open throttle position, then obviously the arc of accelerator pedal movement can be smaller than a construction wherein kickdown is obtained beyond wide open throttle position. The smaller arc of pedal depression may be more comfortable to the driver and the linkage problems may be simplified by the smaller arc of pedal movement. However, if the arc of pedal movement between closed throttle and kickdown positions is reduced too much then the pedal pressures become so high that they become objectionable. Accordingly, a sufficient arc of pedal movement between closed throttle and kickdown positions must be retained to insure acceptable pedal pressures. Of primary concern, however, when the kickdown is effected by movement of the accelerator pedal to a position in advance of wide open position, is that the kickdown does not occur at a point so far in advance of wide open throttle position that the upper power range of the driving engine is rendered ineffective for direct drive. From a consideration of the graphs shown in Fig. 14, wherein curve E represents engine power, curve C throttle valve rotation and curve T transmission throttle cam rotation, it will be noted that 28 degrees of depression of the accelerator pedal 115 will move the accelerator pedal from its closed throttle position, that is engine idle position c, to its wide open throttle position w. It will further be noted from these graphs that an 18 degree accelerator depression from the engine idle position c will move the carburetor throttle valve 271 through 75 degrees of opening movement or bring it to about 95 percent of its wide open throttle position. This same 18 degrees of carburetor depression permits the engine to deliver more than 95 percent of its engine torque. From these same graphs it will be noted that it is not until after the accelerator 115 has been depressed to about 22–24 degrees that the throttle cam 217b will contact the push rod 231 and open valve 232 at point k to effect a kickdown from direct drive to the underdrive accelerating ratio. Accordingly, with an accelerator arrangement such as is graphically represented by the graphs of Fig. 14, it is clear that substantially all of the power or torque of the engine is effective or available for direct drive and the engine is not penalized by the fact that a kickdown is effected before the throttle valve 271 has been moved to its wide open throttle position w. Thus by the specific arrangement of the throttle valve and accelerator pedal linkages hereafter described, it is possible to accomplish a kickdown in advance of wide open throttle position and still keep substantially all the torque of the engine available for direct drive.

Fig. 13 is a fragmentary side elevation of a vehicle power plant embodying this invention. The engine E has a downdraft carburetor 270. The throat 272 of the carburetor 270 has a rotatable throttle valve 271 mounted therein to control fuel flow to the engine E. Fixed to the pivot shaft 273 for the throttle valve 271 is a plate 273a that has a finger portion 274. Finger 274 has pivotally connected thereto a sleeve-like bushing or collar 275. The collar 275 slidably receives the carburetor end of the throttle valve control link 117b. A pin or the like 117c, mounted on the extreme end portion of the link 117b prevents the link 117b from becoming disengaged from the collar 275. Threaded about and extending along the link 117b, from the collar 275 towards an intermediate portion of the link 117b, is a coiled compression spring 276. A washer 277 is anchored to the link 117b to provide a pressure plate to apply compressive forces to the spring 276 when the throttle valve 271 is moved to its kickdown position k. This operation will become apparent from the subsequent description. The spring 115a that is connected between the rotatable plate 273a and the bracket 278 serves to return the throttle valve 271 and its connected accelerator pedal 115 to their closed throttle positions when accelerator depression forces are released. The link 117b is adjustable in length because it is made in two parts that are interconnected by the bolt and slot connector 279.

Mounted on the side of the carburetor body 280 is a pierced ear 281 that slidably receives the stem of a headed plunger 282. Encircling the stem of the plunger 282 between its head and the carburetor ear 281 is a relatively stiff compression spring 283. The compression spring 283 is considerably stiffer than the compression spring 276 that is mounted on the link 117b. The reason for this difference in spring rates will become apparent from a reading of the following description.

With the structure heretofore described, during normal depression of the accelerator 115 between its closed throttle or engine idle position c and position f in advance of the position k, the link 117b, its spring 276 and the slidable collar 275 cooperate to act as a rigid link and cause rotation of the plate 273a and the connected throttle valve 271 in the conventional and expected manner. As pointed out by the previous discussion of the Fig. 14 graphs, depression of the accelerator 115 to its kickdown point k will rotate the throttle valve 271 through about 95 percent of its wide open throttle movement and this will cause a power output of better than 95 percent of the engine wide open throttle power. At the time the accelerator 115 has been depressed to the point f where kickdown is about to be brought into operation, it is desirable to slow down the rate of throttle valve opening movement without slowing down the rate of rotational movement of the throttle pressure cam 217 and its supporting shaft 307. This alteration of the relative rotational speeds of the carburetor throttle valve 271 and the transmission throttle pressure cam 217, when the prekickdown point f is reached, is accomplished by the aforedescribed structure 273—283 in a manner now to be explained.

When the accelerator 115 has been depressed to the position f to initiate kickdown, then finger 274 of the pivoted plate 273a, that is carried by the throttle valve pivot shaft 273, will be brought into engagement with the head of the plunger 282. The position of the plate finger 274 at this time is shown by the dashed lines in Fig. 13. Due to the fact that the plunger spring 283 is stiffer than the link spring 276, it is thought to be obvious that as depression of the accelerator 115 is continued past the position f to actually accomplish the kickdown, the link spring 276 as well as the plunger spring 283 are both compressed but the link spring 276 is compressed to a much greater degree. During this simultaneous compression of the springs 276 and 283 the throttle valve 271 will be continuously moved towards wide open throttle position but its rate of rotational movement will be reduced as clearly shown by the curve portion fw of the curve C of the Fig. 14 graph. From the curve C of Fig. 14, it will be noted that during the 10 degrees of accelerator depression from 18 to 28 degrees of depression, which corresponds to the curve portion *fw*, the throttle valve 271 moves only about 5 degrees or from about 75 degrees to 80 degrees of throttle valve opening movement. At the same time, however, due to the faster rate of compression of the link spring 276, the link 117*b* slides through the collar 275 and permits the pivot plate 117*a* to be rotated through a much greater arc of rotation than the simultaneous arc of rotational movement of the throttle valve 271. This results from the lost motion spring connection 276 and the mechanical advantage of the linkage 117*e*, 117*d*. From the curve T of the Fig. 14 graph it will be noted that the accelerator depression from 18 degrees to 24 degrees, that accomplishes the kickdown at point *k*, causes a corresponding rotation of the lever plate 117*a* and the connected shaft 307 and the throttle pressure cam 217 through an arc of approximately 22 degrees, that is from about 48 degrees to 70 degrees of throttle cam rotation. In this arc of throttle cam movement the kickdown finger 217*b* of the throttle pressure cam 217 is moved into engagement with the kickdown valve plunger 231 and the valve 232 is unseated so as to effect the kickdown from direct drive to an underdrive ratio. In the subsequent 4 degree depression of the accelerator 115 from 24 to 28 degrees of throttle valve opening movement, the compression of link spring 276 permits the lever plate 117*a* and the link 117*d* to rotate the throttle cam 217 through a 15 degree arc, that is from about 70 to 85 degrees of throttle cam rotation. The lost motion connection provided by the link spring 276 and its connection to link 117*b* and plate 273*a* permits the noted relative rotational movements.

It is thought to be apparent from the aforementioned description that with the disclosed linkage arrangement, or one similar thereto, it is possible to accomplish a kickdown before the throttle valve 271 is moved to wide open throttle position yet at the same time prevent the kickdown operation from occurring until after more than 95 percent of the engine torque has been made available for direct drive and not until after the throttle valve 271 has been moved to more than 95 percent of its wide open position. Furthermore, by means of this invention, acceptable accelerator pedal pressures are usable and the kickdown operation can be accomplished without any precise maintenance of linkage tolerances or assembly limitations. This latter feature is one of the important advantages of a device of this type that is intended for large scale manufacture and assembly line installation. Due to the fact that this invention allows the throttle valve to be moved through 95 percent of its wide open throttle movement while the accelerator pedal is being moved through only 18/28 or 64 percent of its throttle opening operation, there is provided a 36 percent range of accelerator pedal movement within which the kickdown can be effected. This wide range of accelerator operation to effect kickdown insures that no close tolerances need be maintained and allows more than enough variation in assembly procedure to insure that the kickdown will never be premature so as to prevent maximum utilization of available engine power and yet it also insures that the kickdown will be effected before a wide open throttle position is reached. This keeps the arc of accelerator depression to an acceptable angle for driver comfort and does not reduce the arc of accelerator depression below the kickdown point to such a degree that high pedal pressures are encountered.

Another advantage of the carburetor throttle valve linkage herein disclosed is that it provides a spring type vibration damper for damping out engine vibrations that would otherwise be transmitted through the carburetor linkage to the driver's compartment of the vehicle. The springs 283, 276 effectively isolate engine vibrations that would otherwise pass from the carburetor 270 to the accelerator 115.

Still another advantage of this invention is the fact that the bumper spring 283 assists in returning the throttle valve 271 and the accelerator 115 to their closed throttle positions and thus return spring 115*a* does not have to be as stiff as would otherwise be the case. With a softer return spring 115*a*, then you have a lighter and more uniform pedal pressure during accelerator depression and pedal feel and driver comfort are improved.

What is claimed is:

1. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a lost motion connection in said throttle valve linkage means operable to permit relative movement between said linkage and said valve when a predetermined movement resisting force is applied to opening movement of said throttle valve, variable resistance means arranged to apply a movement resisting force to said throttle valve during the final portion of the throttle valve opening movement to effect relative movement between said throttle valve linkage and said throttle valve before movement of said throttle valve to wide open throttle position, and additional linkage means for positively connecting said accelerator to the transmission kickdown control after said throttle valve has been moved to said final portion of valve opening movement.

2. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a compressible lost motion connection in said throttle valve linkage means operable to permit relative movement between said linkage and said valve when a predetermined movement resisting force is applied to opening movement of said throttle valve, compressible resistance means arranged to apply a movement resisting force to said throttle valve during the final portion of the throttle valve opening movement to effect relative movement between said throttle valve linkage and said throttle valve before movement of said throttle valve to wide open throttle position, and additional linkage means for positively connecting said accelerator to the transmission kickdown control to transmit the relative movement between said linkage and said throttle valve to said transmission kickdown control after said throttle valve has been moved to said final portion of valve opening movement.

3. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a lost motion spring connection in said throttle valve linkage means operable to permit relative movement between said linkage and said valve when a predetermined movement resisting force is applied to opening movement of said throttle valve, compressible spring resistance means arranged to apply a movement resisting force to said throttle valve during the final portion of the throttle valve opening movement to effect relative movement between said throttle valve linkage and said throttle valve before movement of said throttle valve to wide open throttle position, and additional linkage means for positively connecting said accelerator to the transmission kickdown control after said throttle valve has been moved to said final portion of valve opening movement, said lost motion connection and said spring resistance means cooperating to permit continuous opening movement of said valve between closed throttle and wide open throttle positions with the rate of valve opening movement being varied in different portions of the valve opening range.

4. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a relatively soft, compressible lost motion connection in said throttle valve linkage means operable to permit relative movement between said linkage and said valve when a predetermined movement resisting force is applied to opening movement of said throttle valve, a relatively stiff, compressible, resistance means arranged to apply a movement resisting force to said throttle valve during the final portion of the throttle valve opening movement to effect relative movement between said throttle valve linkage and said throttle valve before movement of said throttle valve to wide open throttle position, and additional linkage means for positively connecting said accelerator to the transmission kickdown control after said throttle valve has been moved to said final portion of valve opening movement, said relatively soft lost motion connection and said relatively stiff resistance means cooperating to permit continuous opening movement of said valve between closed throttle and wide open throttle positions with the rate of valve opening movement being reduced in the final portion of movement just prior to wide open throttle position.

5. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a compressible lost motion connection in said throttle valve linkage means operable to permit progressively decreasing relative movement between said linkage and said valve after a predetermined force resisting throttle valve opening movement is applied to said throttle valve linkage, compressible resistance means arranged to apply a movement resisting force to said throttle valve linkage during the final portion of the throttle valve opening movement of said throttle valve linkage to effect relative movement between said linkage and said valve before movement of said throttle valve to wide open throttle position, and additional linkage means for positively connecting said accelerator to the transmission kickdown control after said throttle valve has been moved to said final portion of valve opening movement.

6. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a compressible lost motion connection in said throttle valve linkage means operable to permit progressively decreasing relative movement between said linkage and said valve after a predetermined force resisting throttle valve opening movement is applied to said throttle valve linkage, compressible means arranged to apply a movement resisting force to said throttle valve linkage during the final portion of the throttle valve opening movement of said throttle valve linkage to effect relative movement between said linkage and said valve before movement of said throttle valve to wide open throttle position, and additional linkage means for positively connecting said accelerator to the transmission kickdown control after said throttle valve has been moved to said final portion of valve opening movement.

7. In combination with an engine having an accelerator operated throttle control valve and a multispeed transmission having a control responsive to accelerator movement to the final portion of throttle valve opening movement to effect a kickdown in speed ratio drive through said transmission, throttle valve linkage means connecting said accelerator to said throttle valve to effect movement thereof between closed throttle and wide open throttle positions, a relatively soft, compressible lost motion connection in said throttle valve linkage means operable to permit progressively decreasing relative movement between said linkage and said valve after a predetermined force resisting throttle valve opening movement is applied to said throttle valve linkage, a relatively stiff, compressible, resistance means arranged to apply a movement resisting force to said throttle valve linkage during the final portion of throttle valve opening movement just prior to wide open throttle position to effect relative movement between said linkage and said valve before movement of said throttle valve to wide open throttle position, and additional linkage means for positively connecting said accelerator to the transmission kickdown control after said throttle valve has been moved to said final portion of valve opening movement, said lost motion connection and said compressible resistance means cooperating to permit continuous opening movement of said valve between closed throttle and wide open throttle positions with the rate of valve opening movement being varied in different portions of the valve opening range.

8. In combination with a throttle valve controlled engine and a multispeed transmission having a control responsive to throttle valve movement to the final portion of throttle valve opening movement to effect a kickdown in speed ratio drive through said transmission, an accelerator connected to said throttle valve by throttle valve actuating linkage operable to cause continuous rotation of said valve between closed and wide open throttle positions, said throttle valve actuating linkage including a compressible lost motion connection to provide for relative movement between said accelerator and said throttle valve when a predetermined force resists throttle valve opening movement, resilient means arranged to apply a progressively increasing force to said throttle valve to resist throttle opening movement thereof during the final portion of its movement between closed throttle and wide open throttle positions, and means for directly connecting said accelerator and the transmission kickdown control after said throttle valve has been moved to said final portion of valve opening movement, said last mentioned means being arranged to provide a mechanical advantage whereby an increased movement of said transmission kickdown control results from a corresponding accelerator movement.

9. In combination with a throttle valve controlled engine and a multispeed transmission having a control responsive to throttle valve movement to the final portion of throttle valve opening movement to effect a kickdown in speed ratio drive through said transmission, an accelerator connected to said throttle valve by throttle valve actuating linkage operable to cause rotation of said valve between closed and wide open throttle positions, said throttle valve actuating linkage including a relatively soft, compressible, lost motion connection to provide for relative movement between said accelerator and said throttle valve when a predetermined force resists throttle valve opening movement, relatively stiff, compressible bumper means arranged to apply a progressively increasing force to said throttle valve to resist throttle opening movement thereof during the final portion of its movement between closed throttle and wide open throttle positions, and means for directly connecting said accelerator and the transmission kickdown control after said throttle valve has been moved to said final portion of valve opening movement.

10. In combination with a throttle valve controlled engine and a multispeed transmission having a control responsive to throttle valve movement to the final portion of throttle valve opening movement to effect a kickdown in speed ratio drive through said transmission, an accelerator connected to said throttle valve by throttle valve actuating linkage operable to cause rotation of said valve between closed and wide open throttle positions, said throttle valve actuating linkage including a lost motion connection to provide for relative movement between said accelerator and said throttle valve when a predetermined force resists throttle valve opening movement, bumper means arranged to engage a part of said throttle valve actuating linkage to apply a progressively increasing force to said throttle valve to resist throttle opening movement thereof during the final portion of its movement between closed throttle and wide open throttle positions, and means for directly connecting said accelerator and the transmission kickdown control after said throttle valve has been moved to said final portion of valve opening movement.

11. In combination with an engine drivingly connected to a multispeed transmission that includes a kickdown control, an engine carburetor having a fuel flow passage therethrough controlled by a rotatable throttle valve, a lever plate drivingly connected to said throttle valve, an accelerator connected by linkage means to said lever plate to provide means for moving said throttle valve between closed throttle and wide open throttle positions, said linkage means including a relatively soft, compressible, resilient, lost-motion connection arranged to provide for relative movement between said accelerator and said throttle valve when a predetermined resistance to throttle valve opening movement is applied, a relatively stiff compressible resilient bumper means arranged to engage said lever plate during the final portion of the movement of said throttle valve from closed throttle to wide open throttle position whereby a progressively increasing force will be applied to said throttle valve resisting throttle opening movement thereof and causing the aforementioned relative movement between the accelerator and the throttle valve to occur, and an additional linkage means for positively connecting said accelerator to said transmission kickdown control after said throttle valve has been moved to said final portion of valve opening movement operable to effect kickdown of the transmission during that portion of movement of the throttle valve when the aforementioned relative movement occurs.

12. In combination with an engine drivingly connected to a multispeed transmission that includes a kickdown control, an engine carburetor having a fuel flow passage therethrough controlled by a rotatable throttle valve, a lever plate drivingly connected to said throttle valve, an accelerator connected by linkage means to said lever plate to provide means for moving said throttle valve between closed throttle and wide open throttle positions, said linkage means including a relatively soft, resilient, lost-motion age means including a relatively soft, resilient, lost-motion connection arranged to provide for relative movement between said accelerator and said throttle valve when a predetermined resistance to throttle valve opening movement is applied, relatively stiff, resilient, bumper means arranged to engage said lever plate during the final portion of the movement of said throttle valve from closed throttle to wide open throttle position whereby a progressively increasing force will be applied to said throttle valve resisting throttle opening movement thereof and causing the aforementioned relative movement between the accelerator and the throttle valve to occur, and an additional linkage means for positively connecting said accelerator to said transmission kickdown control after said throttle valve has been moved to said final portion of valve opening movement operable to effect kickdown of the transmission during that portion of movement of the throttle valve when the aforementioned relative movement occurs.

13. In combination with an engine drivingly connected to a multispeed transmission that includes a kickdown control, an engine carburetor having a fuel flow passage therethrough controlled by a rotatable throttle valve, a lever plate drivingly connected to said throttle valve, an accelerator connected by linkage means to said lever plate to provide means for moving said throttle valve between closed throttle and wide open throttle positions, said linkage means including a compressible, relatively soft, resilient, lost-motion connection arranged to provide for relative movement between said accelerator and said throttle valve when a predetermined resistance to throttle valve opening movement is applied, a compressible relatively stiff resilient bumper means arranged to engage said lever plate during the final portion of the movement of said throttle valve from closed throttle to wide open throttle position whereby a progressively increasing force will be applied to said throttle valve resisting final throttle opening movement thereof and causing the aforementioned relative movement between the accelerator and the throttle valve to occur, and an additional linkage means for positively connecting said accelerator to said transmission kickdown control after said throttle valve has been moved to said final portion of valve opening movement operable to effect kickdown of the transmission during that portion of movement of the throttle valve when the aforementioned relative movement occurs.

References Cited in the file of this patent

UNITED STATES PATENTS

| | | |
|---|---|---|
| 1,572,186 | Cook | Feb. 9, 1926 |
| 2,240,919 | Weintraub et al. | May 6, 1941 |
| 2,599,387 | Hefel | June 3, 1952 |
| 2,726,557 | Ackerman | Dec. 13, 1955 |